United States Patent [19]
Johnson

[11] Patent Number: 5,358,791
[45] Date of Patent: Oct. 25, 1994

[54] STERILIZABLE PACKAGING FILM

[75] Inventor: Richard E. Johnson, Appleton, Wis.

[73] Assignee: American National Can Company

[21] Appl. No.: 25,356

[22] Filed: Mar. 1, 1993

[51] Int. Cl.$^5$ ............................................. B32B 27/08
[52] U.S. Cl. .................... 428/516; 428/35.2; 428/349
[58] Field of Search ............... 428/349, 521, 516, 35.2

[56] References Cited

U.S. PATENT DOCUMENTS

| | | | |
|---|---|---|---|
| 3,410,395 | 11/1968 | Sellers | 206/63.2 |
| 3,496,061 | 2/1970 | Freshour et al. | |
| 3,761,013 | 9/1973 | Schuster | 229/66 |
| 3,926,311 | 12/1975 | Laske | 206/439 |
| 3,930,580 | 1/1976 | Bazell et al. | 206/439 |
| 3,967,729 | 7/1976 | Tanner, II | 206/440 |
| 3,991,881 | 12/1976 | Augurt | 206/439 |
| 4,168,779 | 9/1979 | Yokokoji et al. | 206/439 |
| 4,270,658 | 7/1981 | Schuster | 206/439 |
| 4,367,816 | 1/1983 | Wilkes | 206/349 |
| 4,407,874 | 10/1983 | Gehrke | 428/215 |
| 4,514,965 | 5/1985 | Adachi et al. | 53/550 |
| 4,654,240 | 3/1987 | Johnston | 428/35 |
| 4,657,804 | 4/1987 | Mays et al. | 428/212 |
| 4,724,961 | 2/1988 | Shimoyamada et al. | 206/439 |
| 4,778,697 | 10/1988 | Genske et al. | 428/35 |
| 4,857,409 | 8/1989 | Hazelton et al. | 428/494 |
| 4,937,139 | 6/1990 | Genske et al. | 428/349 |
| 4,965,109 | 10/1990 | Tucker et al. | 428/35.7 |
| 5,071,686 | 12/1991 | Genske et al. | 428/35.7 |
| 5,073,436 | 12/1991 | Antonacci et al. | 428/219 |
| 5,089,308 | 2/1992 | Nordness et al. | 428/35.4 |
| 5,093,164 | 3/1992 | Bauer et al. | 428/35.4 |
| 5,108,844 | 4/1992 | Blemberg et al. | 428/518 |

Primary Examiner—Edith Buffalow
Attorney, Agent, or Firm—Thomas A. O'Rourke

[57] ABSTRACT

A sterilizable multiple layer packaging film comprising a first outer layer comprising polypropylene or propylene copolymers, a core layer comprising polyisobutylene modified high density polyethylene and a second outer layer of about 100% to 10% polyisobutylene modified high density polyethylene or at least one co-polymer thereof.

13 Claims, 2 Drawing Sheets

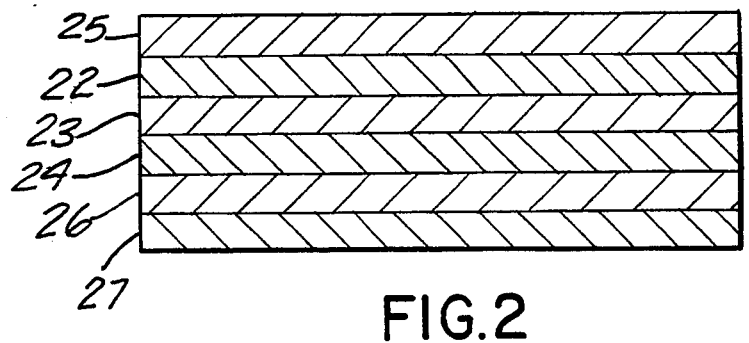
FIG.1
FIG.2
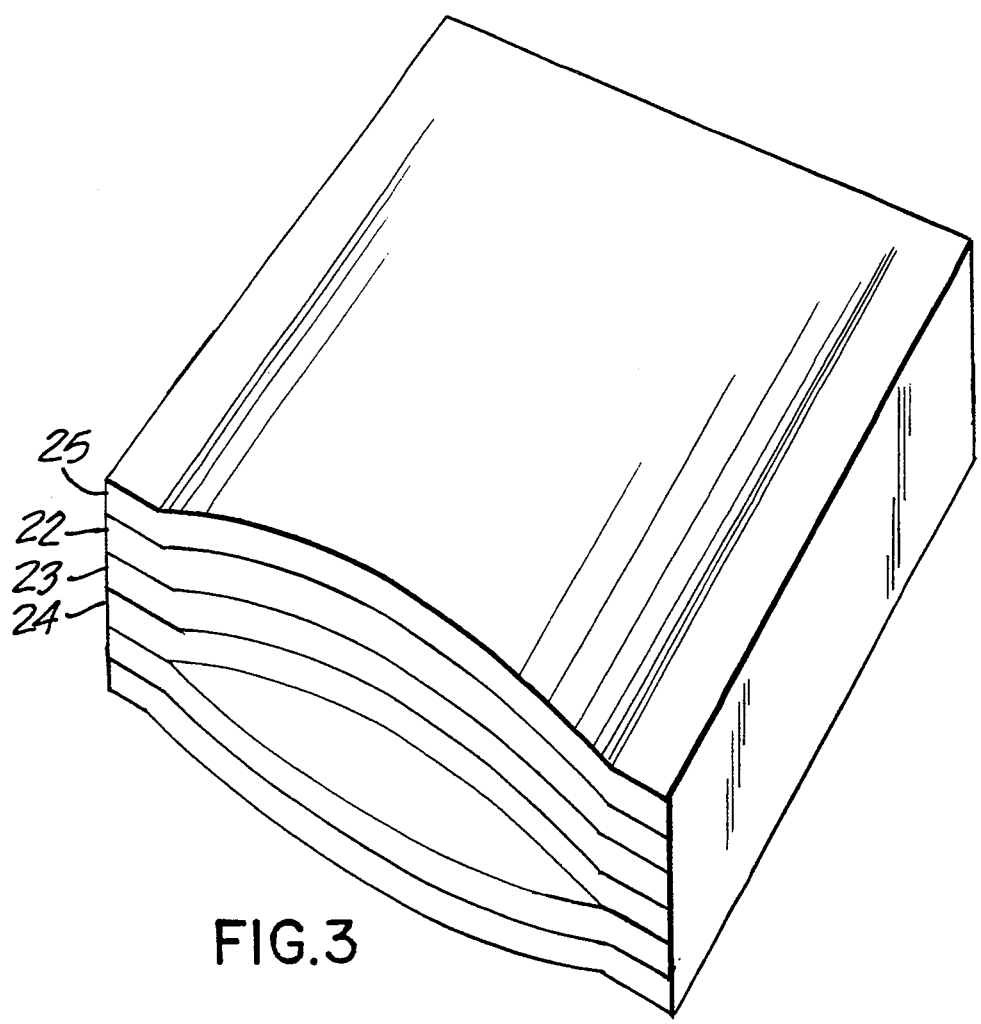
FIG.3

STERILIZABLE PACKAGING FILM

The present invention is directed to improved film structures that are particularly suitable for undergoing sterilization in an autoclave or under similar conditions. The film is particularly useful in forming pouches from at least one sheet of the film structure of the present invention. The film of the present invention may also be a core film or a substrate in a multi-layer film or sheet having additional layers super-imposed on the film of the present invention. The pouch formed from the film of the present invention is generally formed by heat sealing two films together although any suitable means of sealing polymeric films may be used.

In many applications, particularly in the medical field, packaging material must be sterile or sterilizable. Sterilization, particularly in an autoclave, can cause a packaging material to deteriorate due to the high temperatures and pressure as well as the moisture present. The deterioration can include not only damage to the integrity of the package but also discoloration and other problems.

Damage to the integrity of the package can occur for example in the area of the heat seal between the films forming a pouch although the pouch may also be susceptible to damage from tears and punctures in areas away from the heat seal. Also, during the sterilization process, there is a risk of tearing or ripping of the film due to the high pressure resulting from the heat and expansion of gases generated during the sterilization process.

There are a myriad of polymeric materials which may be used in packaging including films for making pouches. Many of these polymeric materials however, while suitable as packaging material under ordinary packaging conditions suffer from discoloration or deterioration when subjected to high temperatures during sterilization particularly in an autoclave. In addition, for some films, while the structural integrity after sterilization may be satisfactory, one problem encountered with many packages made from these films is that the discoloration or other cosmetic defects cause the packaged product to at least appear contaminated to the health service personnel.

Cloudy or spotted packaging caused by deterioration of the film during sterilization can create a likelihood that the personnel will dispose of the product so packaged before use. While this not only increases the cost to the hospital and ultimately to the public, it can also damage the reputation of the company whose product is contained in the package. This results in lost sales not only of the product so packaged but also due to the loss of reputation, other products manufactured by the company may suffer a loss of sales.

Another problem in forming pouches is the problem of seal strength. It has been found that even though a packaging film may survive the harsh environment of an autoclave, the film may not be a suitable packaging material because the seal strength is so great that the package is too difficult to conveniently open. If the seal strength is too weak, there is a risk of rupture not only during the sterilization process but also during transport and use.

In view of the problems in packaging products which must undergo sterilization, there is a need for films and film substrates that are strong, puncture and tear resistant, readily sealable yet peelable, and which do not deteriorate upon sterilization.

BRIEF DESCRIPTION OF THE DRAWINGS

FIG. 1 shows the multilayer film of the present invention.

FIG. 2 shows the multilayer film of the present invention where the film of the invention is the center film with additional layers or films thereon to form a pouch.

FIG. 3 is a pouch made from the film of FIG. 2.

DETAILED DESCRIPTION OF THE INVENTION

Figure 4:
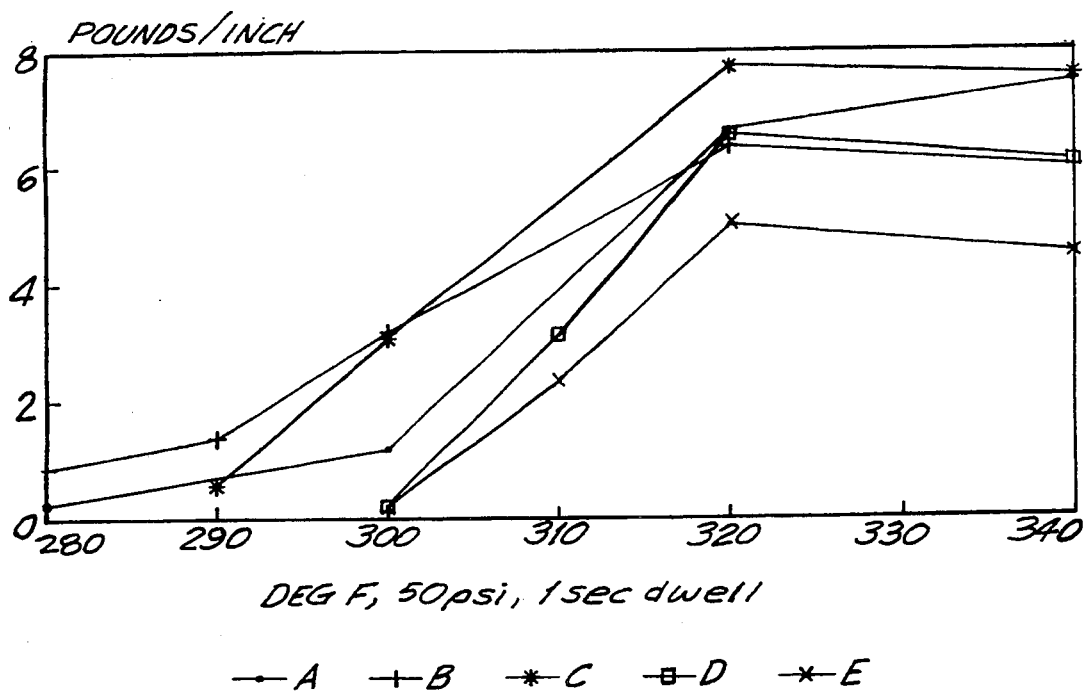
FIG. 4 is a graph comparing the heat seal curves of variables A through E of Example 1.

The film of the present invention is a multilayer film which may be formed by coextrusion or other suitable means. The film of the present invention is especially suitable for applications where sterilization is necessary in, for example, an autoclave. Sterilization of films typically take place at temperatures of 250° F. and up to 275° F. The film also provides a good hermetic seal that protects the packaged product and permits it to remain sterile indefinitely. In addition, the film has a long shelf life and remains peelable for extended periods of time.

The film is preferably a three layer film although additional layers may also be present to improve adhesion between the layers. As shown in FIG. 1, there is a multilayer film 10 having a first outer or sealant layer 11, a core layer 12 and a second outer or sealant layer 13. The first outer layer 11 is preferably a polypropylene and/or a copolymer or copolymers thereof such as propylene-ethylene copolymers or a high density polyethylene. A preferred propylene-ethylene copolymer has ethylene present in the range of 0 to 6% and more preferably 1 to 5%.

One suitable polypropylene is Fina 8473. The core layer 12 is preferably a polyisobutylene (PIB) modified high density polyethylene (HDPE). Alternatively, the core layer may be a rubber modified polypropylene and/or one or more copolymers of polypropylene. While HDPE alone would be satisfactory as a core layer, it has been found that HDPE alone has a tendency to be brittle and difficult to extrude. One suitable PIB modified high density polyethylene that eliminates these difficulties is Allied's Paxon 3204. The second outer or sealant layer 13 may be a blend of about 100-10% PIB modified HDPE and 0-90% polypropylene and/or one or more propylene copolymers. A more preferred blend has 100 to 40% PIB modified HDPE and 0-60% polypropylene or propylene copolymer. A most preferred blend has 60-40% PIB modified HDPE and 40-60% polypropylene or propylene copolymer. The PIB in the HDPE is preferably present in a range of about 5 to 60%, more preferably 20 to 40% and most preferably 25 to 35%.

The film of the present invention is preferably used as a film in a multilayer substrate which substrate may be used to form for example a multilayer composite such as a pouch. Shown in FIG. 2 is the film of the present invention having a first sealant layer 22, a core layer 23 and second sealant layer 24. The first sealant layer 22 may have one or more additional layers adhered or sealed to it. In a preferred embodiment, the first sealant layer has sealed or adhered to it a layer 25 of spun laced polyester such as that sold under the trademark Sontara.

The spunlaced polyester may include wood pulp or rayon. The second sealant layer 24 may also have one or more additional layers adhered or sealed thereto. In a preferred embodiment, the second sealant layer may have an outer film adhered or sealed thereto, such outer film being made up of two layers. One of these two layers, the layer adjacent the second sealant layer 24 is a third sealant layer 26 of polypropylene or a polypropylene copolymer such as propylene-ethylene copolymer. A preferred propylene ethylene copolymer has ethylene present in the range of 0 to 6% and more preferably 1% to 5%. Adjacent the third sealant layer 26 is an outside layer 27 of polyethylene terepthalate and/or nylon. Layer 27 may be a layer of biaxially oriented nylon such as Allied 1500 M, uniaxially cast nylon such as Dartek F101 and/or polyester such as Hostaphan 2600 or DuPont's Mylar.

The composite of FIG. 2 may be formed into a pouch as shown in FIG. 3. The composite of FIG. 2 is formed, for example, by heat sealing layer 24 of the substrate film of the present invention to layer 26 along three of the outer edges to form a pouch as shown in FIG. 3.

The film of the present invention in addition to its suitability in applications is also valuable because of its peelability. The pouch of FIG. 3 for example exhibits good peelability between the second outer or sealant layer 24 and the polypropylene or polypropylene copolymer layer 26. By adjusting the amount of PIB modified HDPE that is blended with the polypropylene the cohesive peel between layers 24 and 26 can be adjusted to suit the particular packaging needs of the user. Packaging structures made with the film of the present invention are further described in copending U.S. application Ser. No. 08/025,425 filed by Mark E. Weiss, et. al., and entitled "Sterilizable Flexible Peel-Seal Pouch Package", the disclosure of which is hereby incorporated by reference.

EXAMPLE 1

A composite was formed of the film of the present invention. This composite had a 4 mil coextruded film of the present invention along with additional layers. This composite had the following structure:

4 Mil Coex Film
PPE (Exxon Extrel 15V)
PET (LBT Mylar)

The 4 mil coex film is the film of the present invention and had the following structure:

Layer 1 Fina 8473 (PPE)
Layer 2 Paxon 3204 (PIB modified HDPE)
Layer 3 Paxon 3204 and Fina 8473

The layer 3 of the substrate was sealed to the PPE layer of the final film. A layer of a spunlaced polyester or other suitable layer could be adhered or sealed to layer 1 of the 4 mil coex film of the present invention if desired. The structure and physical characteristics of the substrate film and each of the variables in the example of the present invention are shown in the following table.

In layer three of variable D, the A-4085 is Mitsui Tafmer, an ethylene alpha-olefin. Disposed between the PPE layer and the PET layer is an adhesive.

Variable A (1)
CALIPER: 4.00 MIL

|  | RESIN | FILM DENSITY | % LAYER | % WEB | LAYER DENSITY | % WT | WT % WEB | COMPONENT WEIGHT | LAYER WEIGHT | DESIRED CALIPER |
|---|---|---|---|---|---|---|---|---|---|---|
| LAYER 1 | Fina 8473 | 0.892 | 100.0% | 25.0% Range | 0.8920 | 24.17% | 24.17% | 13.92 | 13.92 | 1.00 |
| LAYER 2 | PAXON 3204 | 0.936 | 100.0% | 50.0% Range | 0.9360 | 50.72% | 50.72% | 29.20 | 29.20 | 2.00 |
| LAYER 3 | PAXON 3204 | 0.936 | 80.0% | 25.0% Range | 0.9269 | 20.09% | 25.11% | 11.57 | 14.46 | 1.00 |
|  | Fina 8473 | 0.892 | 20.0% |  |  | 5.02% |  | 2.89 |  |  |
|  |  |  |  |  |  |  | 100.00% BASIS WT |  | 57.58 | 4.00 |

SPEC: Variable B (2)
CALIPER: 4.00 MIL

|  | RESIN | FILM DENSITY | % LAYER | % WEB | LAYER DENSITY | % WT | WT % WEB | COMPONENT WEIGHT | LAYER WEIGHT | DESIRED CALIPER |
|---|---|---|---|---|---|---|---|---|---|---|
| LAYER 1 | Fina 8473 | 0.892 | 100.0% | 25.0% Range | 0.8920 | 24.23% | 24.23% | 13.92 | 13.92 | 1.00 |
| LAYER 2 | PAXON 3204 | 0.936 | 100.0% | 50.0% Range | 0.9360 | 50.84% | 50.84% | 29.20 | 29.20 | 2.00 |
| LAYER 3 | PAXON 3204 | 0.936 | 60.0% | 25.0% Range | 0.9179 | 14.96% | 24.93% | 8.59 | 14.32 | 1.00 |
|  | Fina 8473 | 0.892 | 40.0% |  |  | 9.97% |  | 5.73 |  |  |
|  |  |  |  |  |  |  | 100.00% BASIS WT |  | 57.44 | 4.00 |

SPEC: Variable C (Control)
CALIPER: 4.00 MIL

|  | RESIN | FILM DENSITY | % LAYER | % WEB | LAYER DENSITY | % WT | WT % WEB | COMPONENT WEIGHT | LAYER WEIGHT | DESIRED CALIPER |
|---|---|---|---|---|---|---|---|---|---|---|
| LAYER 1 | Fina 8473 | 0.892 | 100.0% | 25.0% Range | 0.8920 | 24.25% | 24.25% | 13.92 | 13.92 | 1.00 |
| LAYER 2 | PAXON 3204 | 0.936 | 100.0% | 50.0% Range | 0.9360 | 50.89% | 50.89% | 29.20 | 29.20 | 2.00 |
| LAYER 3 | PAXON 3204 | 0.936 | 60.0% | 25.0% Range | 0.9147 | 14.92% | 24.86% | 8.56 | 14.27 | 1.00 |
|  | Fina 8473 | 0.892 | 20.0% | Range |  | 4.97% |  | 2.85 |  |  |
|  | A-4085 | 0.877 | 20.0% |  |  | 4.97% |  | 2.85 |  |  |

SPEC: Variable C (Control)
CALIPER: 4.00 MIL

| | RESIN | FILM DENSITY | % LAYER | % WEB | LAYER DENSITY | % WT | WT % WEB | COMPONENT WEIGHT | LAYER WEIGHT | DESIRED CALIPER |
|---|---|---|---|---|---|---|---|---|---|---|
| | | | | | | | 100.00% BASIS WT | | 57.39 | 4.00 |

SPEC: Variable D
CALIPER: 4.00 MIL

| | RESIN | FILM DENSITY | % LAYER | % WEB | LAYER DENSITY | % WT | WT % WEB | COMPONENT WEIGHT | LAYER WEIGHT | DESIRED CALIPER |
|---|---|---|---|---|---|---|---|---|---|---|
| LAYER 1 | Fina 8473 | 0.892 | 100.0% | 25.0% Range | 0.8920 | 24.19% | 24.19% | 13.92 | 13.92 | 1.00 |
| LAYER 2 | PAXON 3204 | 0.936 | 100.0% | 50.0% Range | 0.9360 | 50.77% | 50.77% | 29.20 | 29.20 | 2.00 |
| LAYER 3 | PAXON 3204 | 0.936 | 80.0% | 25.0% Range | 0.9236 | 20.04% | 25.05% | 11.53 | 14.41 | 1.00 |
| | A-4085 | 0.877 | 20.0% | | | 5.01% | | 2.88 | | |
| | | | | | | | 100.00% BASIS WT | | 57.53 | 4.00 |

SPEC: Variable E
CALIPER: 4.00 MIL

| | RESIN | FILM DENSITY | % LAYER | % WEB | LAYER DENSITY | % WT | WT % WEB | COMPONENT WEIGHT | LAYER WEIGHT | DESIRED CALIPER |
|---|---|---|---|---|---|---|---|---|---|---|
| LAYER 1 | Fina 8473 | 0.892 | 100.0% | 25.0% Range | 0.8920 | 24.11% | 24.11% | 13.92 | 13.92 | 1.00 |
| LAYER 2 | PAXON 3204 | 0.936 | 100.0% | 50.0% Range | 0.9360 | 50.59% | 50.59% | 29.20 | 29.20 | 2.00 |
| LAYER 3 | PAXON 3204 | 0.936 | 100.0% | 25.0% Range | 0.9360 | 25.30% | 25.30% | 14.60 | 14.60 | 1.00 |
| | | | | | | | 100.00% BASIS WT | | 57.72 | 4.00 |

The seal strength of each of the variables was tested at various heat seal temperatures. The results of these tests are set out below. Using these results heat seal curves were plotted. The heat seal curves provide data to determine how well the material sealed at various heat seal temperatures. The heat seal curves for the five variables are plotted on the graph of FIG. 4. FIG. 4 shows that the heat seal curve for Variable B is preferred because it has a more gradual increase in seal strength as the temperature increases.

Seal curve, Instron, 90° angle supported tail
50 psi, 1 sec. dwell
PET/PPE (PPE sealed to second outer sealant layer 13 of the coex film)

| | grams/25.4 mm. width | | | | lbs/1" width | |
|---|---|---|---|---|---|---|
| Variable | 280° F. | 290° F. | 300° F. | 310° F. | 320° F. | 340° F. |
| A | 140 | | 550 | | 7.2 | 7.3 |
| | 150 | | 480 | | 6.2 | 7.4 |
| | 60 | | 520 | | 7.4 | 7.6 |
| | 70 | | 450 | | 6.0 | |
| | 120 | | 700 | | 6.2 | |
| Average | 108 | | 540 | | 6.6 | 7.4 |
| B | 550 | 570 | 1600 | | 6.4 | 6.2 |
| | 500 | 430 | 1450 | | 5.5 | 6.0 |
| | 220 | 650 | 1450 | | 6.4 | 5.6 |
| | 400 | 770 | 1400 | | 6.4 | |
| | 280 | 720 | 1300 | | 6.6 | |
| Average | 390 | 628 | 1440 | | 6.3 | 5.9 |
| C | | 250 | 1400 | | 7.4 | 7.0 |
| | | 220 | 1600 | | 7.8 | 7.4 |
| | | 350 | 1250 | | 8.0 | 8.0 |
| | | 200 | 1500 | | 7.8 | |
| | | 250 | 1200 | | 7.5 | |
| Average | | 254 | 1390 | | 7.7 | 7.5 |
| D | | 70 | 90 | 1800 | 6.4 | 6.6 |

-continued

Seal curve, Instron, 90° angle supported tail
50 psi, 1 sec. dwell
PET/PPE (PPE sealed to second outer sealant layer 13 of the coex film)

| | grams/25.4 mm. width | | | | lbs/1" width | |
|---|---|---|---|---|---|---|
| Variable | 280° F. | 290° F. | 300° F. | 310° F. | 320° F. | 340° F. |
| | | 40 | 130 | 1900 | 7.2 | 6.0 |
| | | 60 | 90 | 1500 | 6.8 | 5.4 |
| | | | | 1900 | 5.4 | |
| | | | | | 6.6 | |
| Average | | 57 | 103 | 1775 | 6.5 | 6.0 |
| E | | 60 | 100 | 1200 | 4.6 | 4.4 |
| | | 70 | 60 | 650 | 5.0 | 5.0 |
| | | 80 | 120 | 1200 | 4.0 | 4.0 |
| | | | | 1050 | 5.0 | |
| | | | | 1200 | 6.4 | |
| Average | | 70 | 93 | 1060 | 5.0 | 4.5 |

Comments:
A. 300° F. - very little transfer
B. 290° F. - very little transfer
300° F. - some tear
C. 290° F. - very little transfer
300° F. - very little transfer
start of elongation
D. 310° - very little transfer
start of elongation
E. 310° - very little transfer
start of elongation

EXAMPLE 2

Variables B & E were further tested to evaluate their post autoclave seals. The films were heat sealed on a bench sealer and tested after autoclaving. The seal strengths were measured at heat seal temperatures of 280° F., 290° F., 300° F., 310° F., 320° F. and 340° F. as shown in the table below.

Post-Autoclave Seal Curve 90° angle supported tail
50 psi, 1 sec. dwell
PET/PPE sealed to the second outer sealant layer 13 of
the coex film grams/25.4 mm. width

| | | | Temperature, °F. | | | |
|---|---|---|---|---|---|---|
| Variable | 280° F. | 290° F. | 300° F. | 310° F. | 320° F. | 340° F. |
| B | 790 | 750 | 840 | — | 1320–1000 | 1050–840 |
| | 820 | 800 | 840 | | 1180–740 | 1220–780 |
| | 840 | 740 | 920 | | 1260–900 | 1100–740 |
| | 760 | 780 | 840 | | 1300–900 | 1520–960 |
| | 770 | 800 | 860 | | 1300–1040 | 1300–800 |
| Average | 796 | 774 | 860 | | 1272–916 * ** | 1238–824 * ** |
| E | | 40 | 40 | 70 | 60 | 80 |
| | | 30 | 40 | 60 | 50 | 70 |
| | | 40 | 40 | 60 | 55 | 55 |
| | | 40 | 50 | 60 | 60 | 70 |
| | | 40 | 50 | 55 | 50 | 80 |
| Average | | 38 | 44 | 61 | 55 | 71 |

*Initial
**average peel
Variable B - all seals showed good transfer

EXAMPLE 3

In this example, the pre-autoclave seal strength of pouches was compared to the post-autoclave seal strength. Group I and II were pouches formed of the composite of FIG. 2. Group III was a pouch similar to the composite of FIG. 2 but without layer 25. In Group I, the heat seal was formed at 425° F./2.5 sec./80 psi. In Group II, the heat seal was formed at 425° F./2.0 sec./80 psi. The heat seal in Group III was formed at 330° F./1.0 sec/80 psi. This Example tests the seal strength between layers 24 and 26 of the pouch. The results of the tests are as follows.

Seal strength, Instron, 90° angle supported tail,
film to film measuring the seal strength by peeling
layer 24 from 26, grams/25.4 mm width

| | Pre-autoclave | | | Post-autoclave | | |
|---|---|---|---|---|---|---|
| | End | Left | Right | End | Left | Right |
| Group 1 | 1200 | 1360 | 1300 | 100 | 80 | 80 |
| | 1260 | 1120 | 1120 | 140 | 80 | 70 |
| | | 1180 | 1200 | 150 | 150 | 120–60 |
| | | 1120 | 1120 | | 80 | 120–60 |
| | | | | | 100 | 240–70 |
| Average | 1230 | 1195 | 1185 | 130 | 98 | 160–68 |
| Group II | 1240 | 960 | 1100 | 150 | 70 | 120–80 |
| | 1220 | 1380 | 1140 | 90 | 70 | 130–80 |
| | 1100 | 1200 | 1060 | 120 | 100–60 | 80–70 |
| | 1300 | 900 | 1500 | 100 | 90–60 | 170–70 |
| | 1300 | 1500 | 1220 | 70 | 120–60 | 85–60 |
| Average | 1232 | 1188 | 1204 | 106 | 103–64 | 117–72 |
| Group III | 900 | 900 | 860 | 1080 | 800 | 800 |
| | 1000 | 880 | 820 | 1060 | 1000 | 950 |
| | 900 | 880 | 840 | | 830 | 900 |
| | | 820 | 800 | | | |
| | | 900 | 840 | | | |
| Average | 933 | 876 | 832 | 1070 | 877 | 883 |

EXAMPLE 4

The peelability of seals formed using the substrate of the present invention adhered to additional layers 26 and 27 as shown in FIG. 2 were tested in this Example. The films of the present invention that were tested in this example are identified as Variable 1, Variable 2 and Control. The compositions of these films are listed in the tables below.

Spec: Variable 1
CALIPER: 4.00 MIL

| | RESIN | FILM DENSITY | % LAYER | % WEB | LAYER DENSITY | % WT | WT % WEB | COMPONENT WEIGHT | LAYER WEIGHT | DESIRED CALIPER |
|---|---|---|---|---|---|---|---|---|---|---|
| LAYER 1 | Fina 8473 | 0.892 | 100.0% | 25.0% Range | 0.8920 | 24.26% | 24.26% | 13.92 | 13.92 | 1.00 |
| LAYER 2 | PAXON 3204 | 0.936 | 100.0% | 50.0% Range | 0.9360 | 50.90% | 50.90% | 29.20 | 29.20 | 2.00 |
| LAYER 3 | PAXON 3204 | 0.936 | 50.0% | 25.0% Range | 0.9269 | 12.42% | 24.84% | 7.13 | 14.25 | 1.00 |
| | Fina 8473 | 0.892 | 50.0% | | | 12.42% | | 7.13 | | |
| | | | | | | | 100.00% BASIS WT | | 57.37 | 4.00 |

SPEC: Variable 2
CALIPER: 4.00 MIL

| | RESIN | FILM DENSITY | % LAYER | % WEB | LAYER DENSITY | % WT | WT % WEB | COMPONENT WEIGHT | LAYER WEIGHT | DESIRED CALIPER |
|---|---|---|---|---|---|---|---|---|---|---|
| LAYER 1 | Fina 8473 | 0.892 | 100.0% | 25.0% Range | 0.8920 | 24.28% | 24.28% | 13.92 | 13.92 | 1.00 |
| LAYER 2 | PAXON 3204 | 0.936 | 100.0% | 50.0% Range | 0.9360 | 50.97% | 50.97% | 29.20 | 29.20 | 2.00 |
| LAYER 3 | PAXON 3204 | 0.936 | 40.0% | 25.0% Range | 0.9091 | 9.90% | 24.75% | 5.67 | 14.18 | 1.00 |
| | Fina 8473 | 0.892 | 60.0% | | | 14.85% | | 8.51 | | |
| | | | | | | | 100.00% BASIS WT | | 57.44 | 4.00 |

SPEC: Control
CALIPER: 4.00 MIL

| | RESIN | FILM DENSITY | % LAYER | % WEB | LAYER DENSITY | % WT | WT % WEB | COMPONENT WEIGHT | LAYER WEIGHT | DESIRED CALIPER |
|---|---|---|---|---|---|---|---|---|---|---|
| LAYER 1 | Fina 8473 | 0.892 | 100.0% | 25.0% Range | 0.8920 | 24.23% | 24.23% | 13.92 | 13.92 | 1.00 |

-continued

SPEC: Control
CALIPER: 4.00 MIL

|  | RESIN | FILM DENSITY | % LAYER | % WEB | LAYER DENSITY | % WT | WT % WEB | COMPONENT WEIGHT | LAYER WEIGHT | DESIRED CALIPER |
|---|---|---|---|---|---|---|---|---|---|---|
| LAYER 2 | PAXON 3204 | 0.936 | 100.0% | 50.0% Range | 0.9360 | 50.84% | 50.84% | 29.20 | 29.20 | 2.00 |
| LAYER 3 | PAXON 3204 | 0.936 | 60.0% | 25.0% Range | 0.9179 | 14.96% | 24.93% | 8.59 | 14.32 | 1.00 |
|  | Fina 8473 | 0.892 | 40.0% |  |  | 9.97% | 5.73% | 2.85 |  |  |
|  |  |  |  |  |  |  | 100.00% | BASIS WT | 57.44 | 4.00 |

Figure 5:
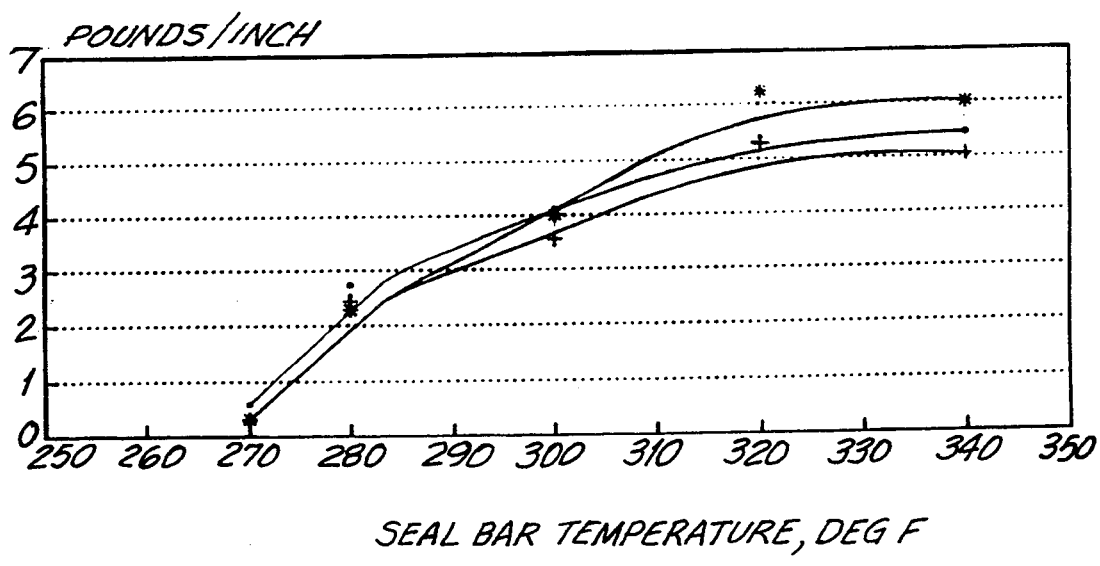
FIG. 5 is a graph comparing the variables of Example 4.

Samples of the three films tested were heat sealed at five different heat seal temperatures ranging from 270° F. to 340° F. The seal strength for each of the seals was then measured. The results were plotted to form the heat seal curves shown in FIG. 5.

Seal Curve, Instron, 90° angle, lbs/1" width
1 sec. dwell, 50 psi
second sealant layer side of coex to PPE side of PET/PPE
sealed through PET/PPE

| Variable | Temperature, °F. | | | | |
|---|---|---|---|---|---|
|  | 270° F. | 280° F. | 300° F. | 320° F. | 340° F. |
| 1 | .35 | 2.85 | 4.0 | 5.0 | 5.3 |
|  | .88 | 2.55 | 4.5 | 6.0 | 5.8 |
|  | .35 | 2.64 | 3.9 | 5.4 | 5.2 |
|  | .88 | 2.78 | 4.4 | 5.3 | 5.0 |
|  | .55 | 2.95 | 3.9 | 5.3 | 6.0 |
| Average | .60 | 2.75* | 4.14** | 5.40 | 5.46 |
| 2 | .44 | 2.42 | 3.7 | 5.5 | 5.1 |
|  | .66 | 2.60 | 3.5 | 5.0 | 5.4 |
|  | .15 | 2.42 | 3.4 | 5.3 | 4.9 |
|  | .10 | 2.42 | 3.5 | 5.0 | 5.3 |
|  | .15 | 2.33 | 3.7 | 5.5 | 4.5 |
| Average | .30 | 2.44* | 3.56*** | 5.26 | 5.04 |
| 3 (Control) | .30 | 2.0 | 5.3 | 6.4 | 6.3 |
|  | .55 | 2.10 | 3.4 | 6.0 | 6.0 |
|  | .15 | 2.10 | 3.7 | 6.7 | 6.2 |
|  | .48 | 2.80 | 3.2 | 6.1 | 5.8 |
|  | .18 | 2.47 | 4.5 | 6.0 | 5.7 |
| Average | .33 | 2.29* | 4.02*** | 6.24 | 6.0 |

*Good seal transfer.
**Delamintion at this point.
***At this point seal started to elongate.

I claim:

1. A sterilizable multilayer film comprising a first outer layer comprising polypropylene or propylene copolymers, a core layer comprising polyisobutylene modified high density polyethylene and a second outer layer of about 100% to 10% polyisobutylene modified high density polyethylene and about to 90% of a second component comprising polypropylene or at least one copolymer thereof.

2. A sterilizable multilayer film comprising a first outer layer, a core layer of rubber modified polypropylene and/or copolymers thereof and a second outer layer of about 100% to 10% polyisobutylene modified high density polyethylene and about 0 to 90% polypropylene and/or one or more propylene copolymers.

3. The multilayer film of claim 1 wherein said second component of said second outer layer comprises polypropylene and at least one copolymer thereof.

4. The multilayer film of claim 2 wherein said core layer comprises said rubber modified polypropylene and copolymers thereof.

5. The multilayer film of claim 2 or 4 wherein said second component of said second outer layer comprises polypropylene and at least one copolymer thereof.

6. The multilayer film according to claim 1, 2, 3, 4 or 5 wherein said second outer layer comprises about 100% to 40% polyisobutylene modified high density polyethylene and about 0 to 60% of said second component.

7. The multilayer film according to claim 4 wherein said second outer layer comprises about 60 to 40% polyisobutylene modified high density polyethylene and about 40 to 60% polypropylene and copolymers thereof.

8. The multilayer film according to claim 3, 4, or 5 wherein at least one of said polypropylene copolymers is a propylene-ethylene copolymer.

9. The multilayer film according to claim 8 wherein said propylene-ethylene copolymer has 0 to 6% ethylene.

10. The multilayer film according to claim 9 wherein said propylene-ethylene copolymer has 1 to 5% ethylene.

11. The multilayer film according to claim 1, 2, 3, 4 or 5 wherein the core layer contains about 5 to 60% polyisobutylene.

12. The multilayer film according to claim 11 wherein the core layer contains about 20 to 40% polyisobutylene.

13. The multilayer film according to claim 12 wherein the core layer contains about 25 to 35% polyisobutylene.

* * * * *